United States Patent
Zhang

(10) Patent No.: US 7,584,371 B2
(45) Date of Patent: Sep. 1, 2009

(54) POL SYSTEM ARCHITECTURE WITH ANALOG BUS

(75) Inventor: Jason Zhang, Monterey Park, CA (US)

(73) Assignee: International Rectifier Corporation, El Segundo, CA (US)

( * ) Notice: Subject to any disclaimer, the term of this patent is extended or adjusted under 35 U.S.C. 154(b) by 371 days.

(21) Appl. No.: 11/389,573

(22) Filed: Mar. 17, 2006

(65) Prior Publication Data
US 2006/0212138 A1 Sep. 21, 2006

Related U.S. Application Data

(60) Provisional application No. 60/662,897, filed on Mar. 17, 2005.

(51) Int. Cl.
  G06F 1/26 (2006.01)
  B23K 11/24 (2006.01)
(52) U.S. Cl. .................. 713/310; 713/300; 323/318
(58) Field of Classification Search ................. 713/300, 713/310; 363/74; 323/234, 318
  See application file for complete search history.

(56) References Cited

U.S. PATENT DOCUMENTS

| | | | |
|---|---|---|---|
| 4,118,772 A | 10/1978 | Takada | |
| 6,031,749 A * | 2/2000 | Covington et al. | 363/98 |
| 6,329,800 B1 * | 12/2001 | May | 323/283 |
| 6,437,545 B2 * | 8/2002 | Sluijs | 323/222 |
| 6,498,940 B1 | 12/2002 | McKinley | |
| 6,542,390 B2 * | 4/2003 | Bixel | 363/71 |
| 6,803,805 B2 * | 10/2004 | Wang et al. | 327/534 |
| 6,836,849 B2 * | 12/2004 | Brock et al. | 713/310 |
| 6,901,271 B1 * | 5/2005 | Cheah et al. | 455/564 |
| 7,000,125 B2 * | 2/2006 | Chapuis et al. | 713/300 |
| 7,080,265 B2 * | 7/2006 | Thaker et al. | 713/300 |
| 2004/0179382 A1 | 9/2004 | Thaker et al. | |

OTHER PUBLICATIONS

Official Letter issued Dec. 24, 2008 in connection with corresponding Taiwanese Application No. 95109212.

* cited by examiner

*Primary Examiner*—Thuan N Du
(74) *Attorney, Agent, or Firm*—Farjami & Farjami LLP

(57) ABSTRACT

A power control system and method including a plurality of point-of-load regulators (POL) providing corresponding regulated output voltages; a manager for communicating control signals and operational parameters with said point-of load regulators; a digital bus to carry control signals therebetween; and an analog bus to carry operational parameters therebetween. Analog sensing circuits and a mutliplexer on the POL communicate operational parameters to and from the manager via the analog bus and are controlled via the digital bus. The operational parameters include output voltage, output current, over voltage, temperature, amplifier or comparator offset, and amplifier gain. The analog sensing circuits are calibrated by trim registers on the POL under digital control by the manager.

20 Claims, 4 Drawing Sheets

POL SYSTEM ARCHITECTURE WITH ANALOG BUS

CROSS REFERENCE TO RELATED APPLICATIONS

The present application is based upon and claims priority of provisional application No. 60/662,897, filed Mar. 17, 2005, incorporated by reference.

BACKGROUND OF THE INVENTION

1. Field of the Invention

The present invention relates to controlling point-of-load regulators, and more particularly, to a system and method using an analog bus to communicate with point-of-load regulators.

2. Related Art

Point-of-load ("POL") regulators, which are also referred to as voltage regulators or DC/DC converters, are commonly used in conjunction with electronic circuits, typically to satisfy voltage/current requirements of the electronic circuits that differ from the voltage that is readily available or the current that can practically be delivered. For example, some electronic devices only include a single voltage input (e.g., 12 v), but require different voltages for circuits contained within (e.g., 1.2 v, 3.3 v, 5 v, etc.). A common solution is to design multiple POL regulators within the device for converting the single input voltage into multiple voltage levels internally.

As another example, some electronic devices include circuits that require low voltage (e.g., 1 v), high current (e.g., 100 A) power supplies. This is problematic in that it is impractical to deliver high current at low voltages over a relatively long distance and still meet desired regulation performance. A common solution is to use a high voltage, low current power supply and design a POL regulator near the internal circuit. This allows low current to travel throughout the device, and provides a low voltage, high current power supply (i.e., using the POL regulator) near the internal circuit.

Traditionally, a plurality of POL regulators will operate in conjunction with a supervisory power supply controller ("controller," "manager" or "master") that digitally activates, programs, and monitors the POL regulators. Specifically, the controller uses a multi-connection serial or parallel bus (e.g., a six bit parallel bus) to activate and program each POL regulator. Such a parallel bus may include an enable/disable bit for turning the regulator on and off and VID code bits for programming the output voltage or current set-point of the regulator and other bits for sequencing. The controller further uses additional connections (e.g., two or three wires) to monitor the voltage/current that is being delivered by each regulator, the ambient temperature, and other factors.

A drawback with such control systems is that they add complexity and size to the overall electronic device by using, for example, a six bit parallel bus to operate each POL regulator and three additional wires to monitor each POL regulator. In other words, a controller operating in accordance with this control system may utilize twenty-seven connections (i.e., twenty-seven wires or traces) in order to communicate with three POL regulators.

Another issue with the digital bus is that it requires multiple D/A and A/D conversion stages, which are expensive and also introduce delay. Further, it provides only imprecise control and monitoring of the POL regulator's functions and parameters. The least significant bit on a 6-bit digital bus may affect the output voltage set point as much as 50 mV or 5% of a 1V output, for example. Using more bits will solve the resolution problem at the expense of rapidly increased complexity and cost. It also requires duplicated internal components for precision voltage reference, A/D, sequencing and DSP in each POL regulator, which increases their cost for systems with multiple POLs.

On the other hand, digital serial communication of non-critical data and control signals can be highly effective and economical.

It would be advantageous to have a system and method for communicating with POL regulators that overcomes these drawbacks.

More particularly, it would be desirable to achieve the benefits of the digital platforms, such as programmability and communications, which may include the use of proprietary techniques and/or known techniques such as I$^2$C. It would also be desirable to use suitable existing technologies, such as IC design and fabrication techniques and components such as EEPROM's and the existing precise and reliable analog PWM technology.

SUMMARY OF THE INVENTION

To satisfy these and other goals, the invention provides a two-level architecture including a manager (master) IC and a plurality of POL (or "slave") ICs, and having analog as well as digital communication between the manager and the POLs.

Accordingly, one aspect of the invention relates to a power control system and method including a plurality of point-of-load regulators (POL) providing corresponding regulated output voltages; a manager for communicating control signals and operational parameters with said point-of load regulators; a digital bus to carry control signals therebetween; and an analog bus to carry operational parameters therebetween. Analog sensing circuits and a mutliplexer on the POL send operational parameters to the manager via the analog bus and are controlled via the digital bus. The operational parameters include output voltage, output current, over voltage, temperature, amplifier or comparator offset, and amplifier gain. The analog sensing circuits are calibrated by trim registers on the POL under digital control by the manager.

Other features and advantages of the present invention will become apparent from the following description of embodiments of the invention which refers to the accompanying drawings.

DETAILED DESCRIPTION OF EMBODIMENTS OF THE INVENTION

Figure 1:
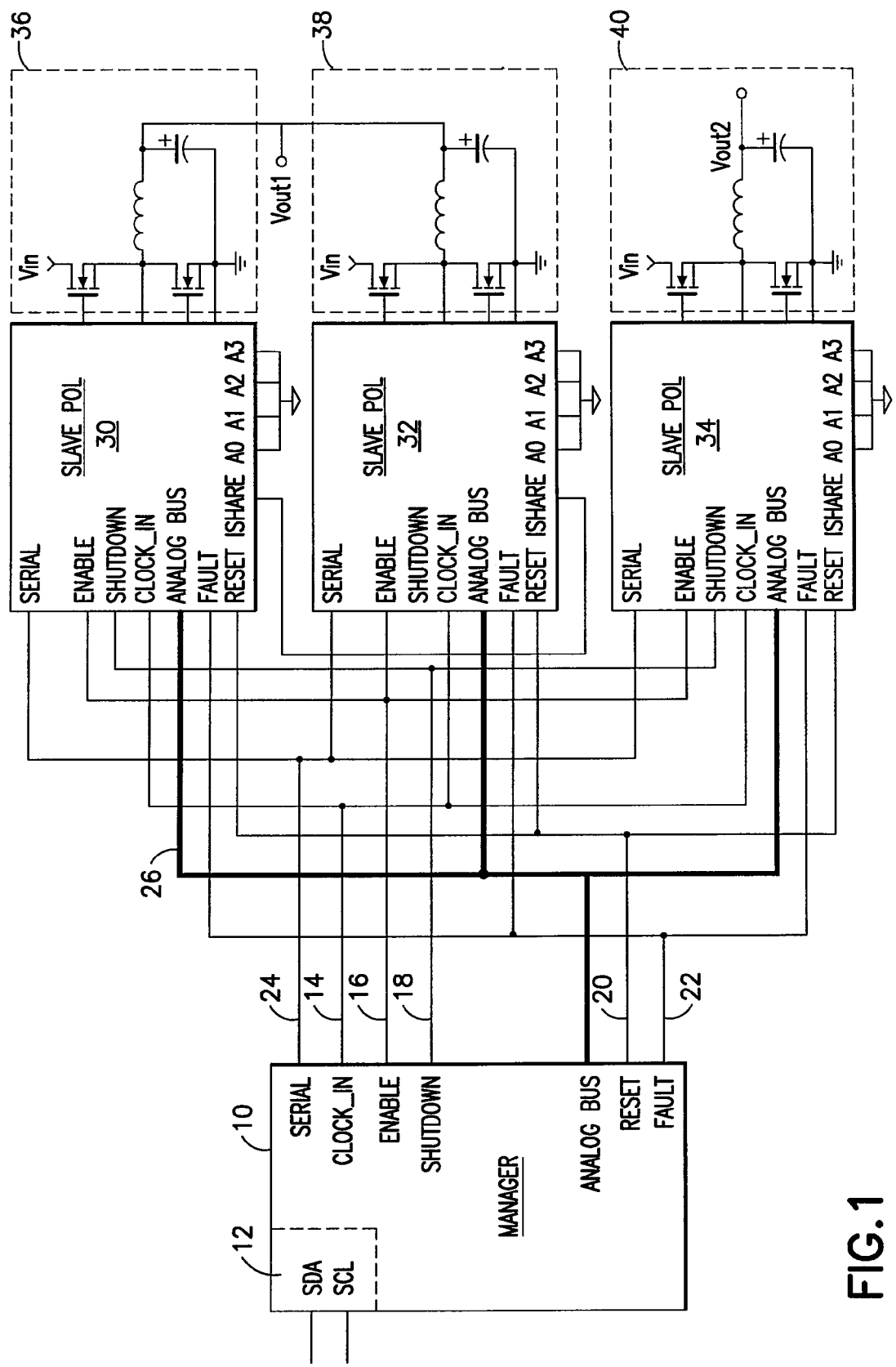
FIG. 1 is a schematic diagram of an architecture according to an embodiment of the invention including a master IC and a plurality of POL ICs.

FIG. 1 is a system-level schematic diagram of the architecture according to an embodiment of the invention. A manager IC 10 is controlled externally by an I$^2$C interface 12. Analog clock, enable, shutdown, reset and fault signals are communicated via lines 14, 16, 18, 20, 22. Addressing of the POLs is carried out over a serial digital bus 24. In this example, there are three POLs 30, 32, 34. Also linking the manager and the POLs is an analog bus 26.

As seen in FIG. 1, the specific application of the POLs in this example is to power a plurality of DC-DC buck power supply circuits 36, 38, 40.

When several POLs are connected in parallel like 30 and 32 to provide more output current, current sharing between these POLs is important, and can be achieved traditionally by having a single current sharing wire between them. Ishare represents the average output current, and each POL compares its output current against it to adjust its output current to achieve output current sharing.

With serial communication, each POL needs to have its unique address or ID for the master to address each one individually. A0-A3 are a 4-bit address, and by having them either connected to ground or floating, A0-A3 can be used to represent 32 unique addresses, i.e., the system can handle up to 32 POLs in this case.

In this arrangement, only one set of high precision analog circuitry is needed, and can be located on the manager IC 10 since fast analog communication between the manager and the POLs is available, and the master continuously calibrates the slave POLs. Examples of precision circuitry may include, without limitation: a 0.1% voltage reference, high-speed A/D circuitry and clock circuitry. The manager IC may be microcontroller- or ASIC-based. Precision circuitry is not required on the POLs, reducing cost and complexity. The precise output regulation from each POL is achieved by continuously calibrating each POL against the master's precision reference via the analog bus.

In an exemplary embodiment, each POL has a unique address ID. The master polls (through the serial digital bus) each POL to put (multiplex) the local reference voltage (5% precision for example) on the analog bus, then the master compares the analog bus signal against its internal high precision reference (0.1% for example). If the POL reference is lower, the master tells this specific POL via the serial digital bus to increase its reference voltage by changing a D/A output or trim register output. Then the analog bus voltage will be compared again to the master reference. If it is still low, the master tells the POL via the serial bus to increase the reference D/A again. This process continues until the analog bus signal is within the acceptable range of the master's internal reference. When it is done with this POL, the master moves on to the next POL, and the same process repeats itself. Besides these references, other signals can be trimmed or calibrated in the same fashion. For example, an offset voltage of an amplifier can be outputted to the analog bus, and the master can command the POL to adjust its amplifier offset until the analog bus signal reduces to zero.

Figure 2A:
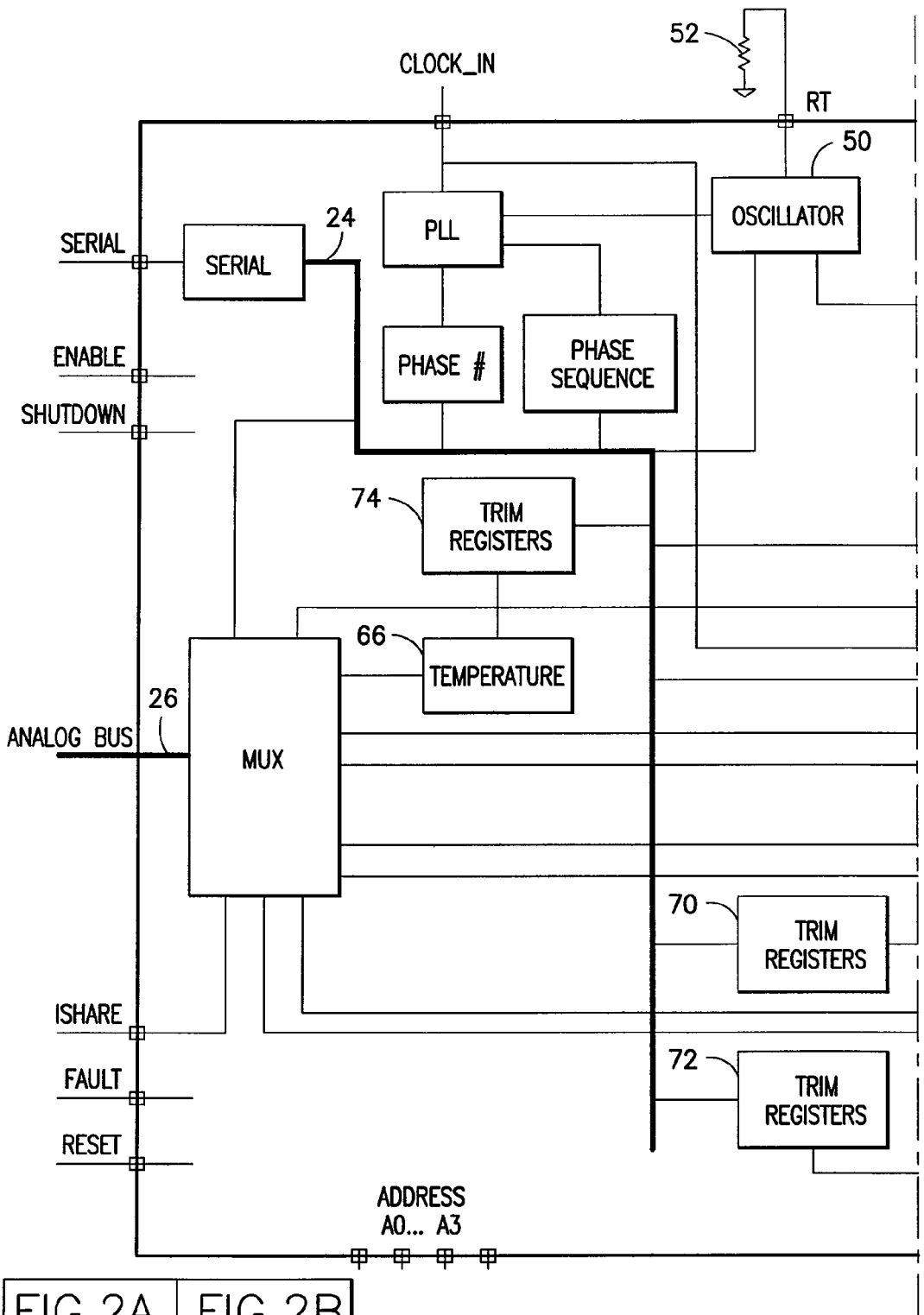
FIG. 2 is a schematic block diagram of one of the POL ICs.
Figure 2B:
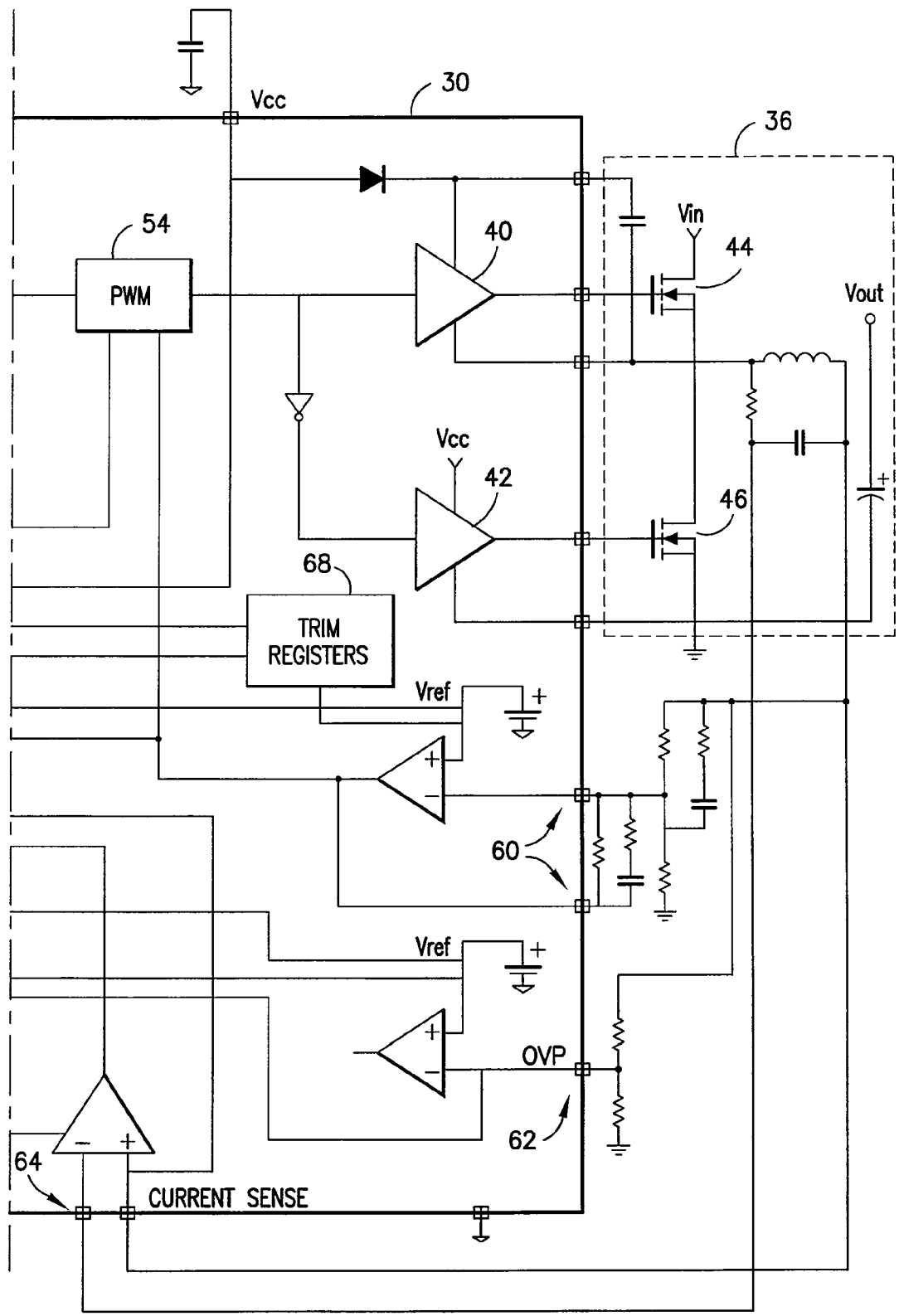

Referring now to FIG. 2, the POL 30 is shown in more detail. In this non-limiting example, the POL includes drivers 40, 42 for MOSFETs 44, 46 in the DC-DC converter 36. An oscillator 50 (with frequency controlled by a resistor 52) generates pulses whose width is set by a PWM circuit 54. The PWM circuit 54 controls the duty cycle of the drivers 40, 42 and thereby the $V_{out}$ of the converter 36.

The POL 30 also includes output voltage sensing at 60 where an output voltage compensation error amplifier is provided to regulate output. The capacitors and resistors are for system control compensation to maintain a stable output, overvoltage sensing at 62, current sensing at 64, and a temperature sensor 66, having respective trim registers 68, 70, 72, 74 for trimming the analog parameters. The trim registers are D/A circuits, which have good LSB bit resolution but do not need to have absolute accuracy. Most analog circuits in slaves are fairly simple and cheap, and do not meet the precision analog control requirements. However, by comparing itself against the master reference via the analog bus, the D/A circuit will adjust its output up or down until the POL internal reference matches the precision reference coming out of the master. In this way, a cheap POL with an initial reference of 5% can achieve 0.1% output voltage regulation through this calibration process, which can happen during startup or continuously in real time. The analog parameters that can be calibrated include reference voltage, offset voltage of comparators or operational amplifiers, temperature sensor output, operational amplifier gain, etc.

Analog data from these sensors are multiplexed onto the analog bus 26 by MUX 76.

In multi-phase or multi-output systems, it is desirable to have all of the POLs synchronized and interleaved so that output or input current and voltage ripples can cancel each other out and reduce noise or EMI. Each POL needs to synchronize to the external master clock at a different phase angle, which is programmed by the master via the serial digital bus. PLL stands for phase lock loop. It locks into the external clock bus at the base frequency or N times higher. The phase # register is programmed by the master via the serial digital bus to tell the POL how many phases there are in the multi-phase configuration, and the sequence register is also programmed by the master via the serial digital bus to tell the POL which location this particular POL is at in this multi-phase configuration. The output of the PLL can be the phase # register times the clock frequency (for example: for a 3-phase system, PLL output will be 3-times the external clock frequency). Then the internal PWM clock (oscillator 50) will synchronize to the specific phase of the external clock based on the sequence register. For example: the sequence register may be 2 for a 3-phase system. This POL will synchronize to the $2^{nd}$ of the PLL output pulses, which are 3× the external clock, so that this POL becomes 120 degrees out of phase with regard to the external clock.

Unless indicated otherwise, the circuits on the POL IC 30 are controlled by the digital bus 24, while operational parameter data is communicated by the analog bus 26.

The POL 30 is capable of stand-alone operation without the manager 10. The slaves are all stand-alone POLs with analog controls (as compared to digital PWM controllers). An important feature of the described POL is that its initial precision and cost are greatly reduced, relying on the master to calibrate and communicate to a host system through I²C. Once calibrated, it can run without the master for some time (until it is time for the next calibration cycle). This greatly improves its reliability and safety without relying on the master continuously. In other two-chip solutions, when the master is down, the whole system is down immediately.

It is also emphasized that the analog bus is used to calibrate all POLs. Besides that function, all POL parameters such as current and voltage and temperature are multiplexed into the analog bus for the master to sample and monitor (supervise) the whole POL system, then report to the host system via I²C. In this way, all these parameters do not need to be digitized in the slave POLs, which reduces cost. Only one set of precision A/D in the master is sufficient to sample and digitize these parameters and feed them to the host via I²C.

In addition, based on the information it samples, the master can make power management decisions. For example, when it finds out one POL is too hot, it can shut it down and report it to the host. Basically the POLs can be cheap analog circuits, while the master can be the sole expensive mixed signal IC that has precision for reference and A/D, provides supervisory and monitoring functions, and handles all I²C communication with the host.

As described, the slave POLs communicate digitally with the manager, analog signals are multiplexed to the manager via the MUX and the analog bus, while all analog parameters are trimmable via digitally controlled trim registers or D/A registers. A trim register may comprise a digital potentiometer, which changes its resistance via digital command. Changing resistance is one way of adjusting analog output signals such as reference voltages. Essentially it adjusts its analog output gradually via N-bit digital signals. For example, a 5% reference with a 6-bit trim will have enough resolution to go down to 0.1% precision.

More specifically, $V_{out}$, $I_{out}$ and Temp are multiplexed to and sampled by the manager IC via the analog bus, while Offset (offset of amplifiers or comparators, which is important in extracting precise analog information such as output current through the dc resistance of output inductor), $V_{ref}$ and DC Gain (gain of amplifiers, which is important in amplifying precise small-signal analog information such as output current through the dc resistance of an output inductor) are trimmed by the manager IC.

Figure 4:
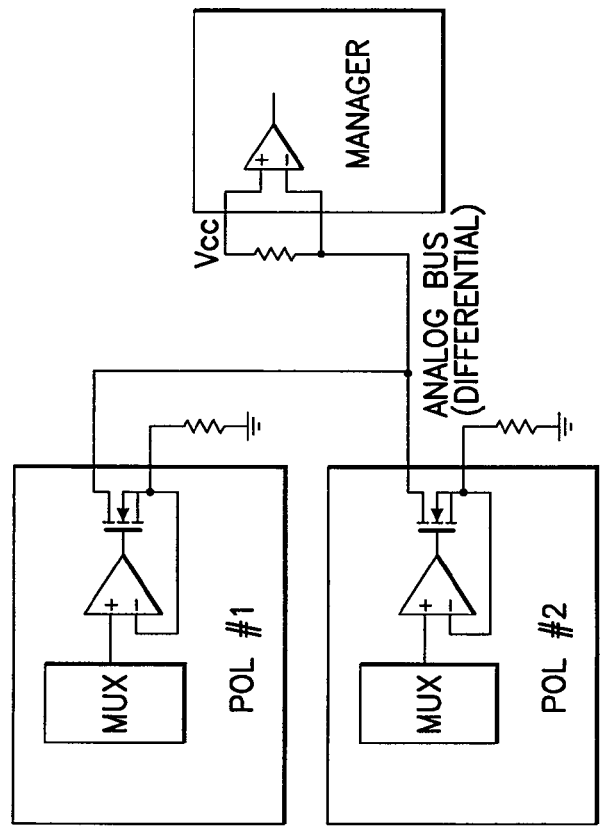
FIG. 4 is a schematic diagram of another suitable analog bus configuration.
Figure 3:
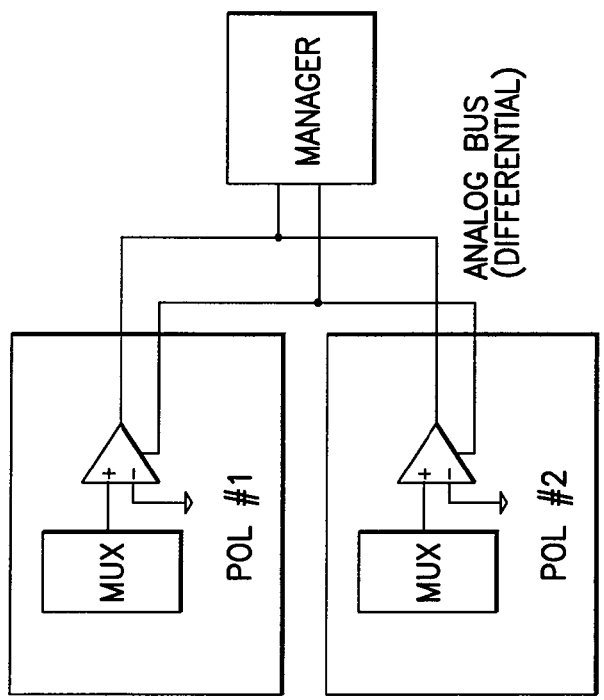
FIG. 3 is a schematic diagram of one suitable analog bus configuration.

FIGS. 3 and 4 show two suitable configurations for the analog bus. FIG. 3 shows a differential voltage bus in which signals are level-shifted differentially. To solve the ground error problems associated with a single wire analog bus, a two-wire differential analog bus can be adopted. Within each POL, there is a unit-gain differential error amplifier that level-shifts the analog signal out of multiplex from the local ground to the two-wire analog bus. In FIG. 4, data is transferred in the form of a current, which is less sensitive to ground interference. The previous analog bus of FIG. 3 transmits analog signals in the form of voltage. Another approach is to convert the analog signal after MUX into current, then current flows through the analog bus, and then is converted back to voltage at the master. Current information will not be affected by ground differences between POL and master.

According to other advantageous features of the embodiment, the well-known I²C bus may be used by the manager to communicate with an external system. However, though I²C can be used between POL and master, it may not be the most suitable for this purpose. For example, it is complicated, slow and limited to eight addresses for each I²C port. Any suitable high-speed digital serial communication protocol may be used between ICs.

The manager can advantageously use a non-volatile type of memory (such as EEPROM) to store configuration information in production and for a data log. Slave ICs can use volatile-type memory registers (such as flip-flops). EEPROM is attractive, but not necessary in the slave ICs. Trimming and configuration data are provided to the slave IC memories during start-up by the manager.

The PLL is used to program phase delays. Phase number and phase sequence are programmed during start-up and synchronized to the master clock from the manager.

Different outputs and different ASIC loads may require the output voltage to start-up or power down in a certain sequence. For example, 3.3V may have to power up first before 1.8V is allowed to power up. Through the common clock and enable signal, POLs can be programmed to power up or power down individually with respect to the clock. For example, 3.3V can power up at onset of enable signal in 1024 steps and one step per 10 clocks, which can be programmed by the master in its reference voltage D/A register. 1.8V POL can wait 1024×10 clock cycles for 3.3V to complete its start-up, then start its own power up in N steps, which is timed and programmed according to the external clock. With common clock and enable signals, all POLs can find their own time based reference based on this power sequencing.

The various D/A converters and counters for ramping up POL reference voltage are calibrated by the master during start-up; and open loop start-up via dynamic D/A counter is synchronized by the master clock and enable, and monitor D/A counter vs. Vo to indicate tracking error if any. This enables soft turn-on and soft turn-off. Shutdown may be an immediate turn-off.

For the manager IC, a microprocessor is preferred for maximum flexibility and minimum R&D cost. On the other hand, an ASIC may be cheaper overall, but also may be less flexible for keeping up with design changes.

The disclosed embodiment provides speed and precision. Switching frequency is contemplated to be 400 kHz to 1.2 MHz without duty cycle limitation, and regulation is calibrated by the manager to 0.1-0.5% continuously. It is cheap in that expensive components such as A/D and bandgap references are implemented only once, in the manager IC. It features trimming and calibration of $V_{ref}$, offset, gain, etc.; Monitoring of $V_{out}$, $I_{out}$, temp, etc.; and programmability multiphase or multi-output, tracking/sequencing, sync, etc. Its benefits include the following:

1. Low cost, because precision analog devices reside mainly in the master, and the lower-precision POLs are calibrated continuously through the master.

2. Can provide I²C communication between an external host and the master in summarized or organized fashion so that the host has one central device to talk to, instead of talking to 32 POLs directly and having to dealing with laborious details such as start-up timing, monitoring and fault protections.

3. During non-calibration period, analog signals are fed to the analog bus one by one under control by the master, the master samples and monitors the signal to determine if it's within spec and if there is a fault, then takes action to respond to faults according to a pre-determined strategy.

4. Programmability is provided in the master with non-volatile memory, and can be easily updated. Master and POL ICs can come from two different IC processes, which can be individually optimized.

5. It is far less radical and has the best of both worlds, analog and digital. The POLs are still traditional analog circuits except for the serial digital port and D/A circuits and multiplexer circuit. The known full-digital solutions in contrast have to cope with high speed PWM, high precision A/D and very high digital clock speeds in an IC process that may not be cost effective when high voltage circuits such as drivers are integrated.

Although the present invention has been described in relation to particular embodiments thereof, many other variations and modifications and other uses will become apparent to those skilled in the art. Therefore, the present invention is not limited by the specific disclosure herein.

What is claimed is:

1. A power control system comprising:
a plurality of point-of-load regulators (POL) providing respective regulated output voltages;
a manager for communicating control signals and operational parameters with said point-of-load regulators, said manager having a manager reference voltage source generating a manager reference voltage;
a bi-directional, digital bus connected to said manager and to each of said plurality of point-of-load regulators to permit communication of said control signals therebetween; and
a bi-directional analog bus connected to said manager and to each of said plurality of point-of-load regulators to permit communication of said operational parameters therebetween;

wherein each said POL has a local reference voltage source generating a local reference voltage, said manager operating to poll each said POL via the digital bus, said POL in response to polling multiplexing the local reference voltage on the analog bus, said manager operating to compare the local reference voltage on the analog bus against said manager reference voltage and generating a signal on the digital bus to control the local reference voltage source in the POL until the local reference voltage is within an acceptable range of the manager reference voltage.

2. The system of claim 1, wherein each said POL has at least one analog sensing circuit for sensing an operational parameter and for supplying said parameter to said manager via the analog bus.

3. The system of claim 2, wherein said POL has a plurality of analog sensing circuits for sensing respective operational parameters, said parameters being selectively supplied to said analog bus via a multiplexer of said POL, said multiplexer being controlled digitally by said manager via said digital bus.

4. The system of claim 3, wherein said operational parameters are selected from the group consisting of output voltage, output current, over voltage, temperature, amplifier or comparator offset, and amplifier gain.

5. The system of claim 2, further comprising a calibrating circuit for calibrating said at least one analog sensing circuit, said calibrating circuit being controlled digitally by said manager via said digital bus.

6. The system of claim 1, wherein each said POL further comprises a PWM circuit which controls the duty cycle of said drivers.

7. The system of claim 6, further comprising a pair of switching devices in a half-bridge arrangement, each of said switching devices having a control input terminal connected to a respective one of said internal drivers.

8. The system of claim 7, wherein a node defined between said pair of switching devices is connected for supplying current to components of a buck converter circuit.

9. A point-of-load regulator (POL) having a digital data interface and an analog data interface adapted to communicate control signals and operational parameters with a manager via a digital bus and an analog bus, respectively, the manager having a manager reference voltage source generating a manager reference voltage,;
wherein said POL has a local reference voltage source generating a local reference voltage, said manager operating to poll said POL via the digital bus, said POL in response to polling providing the local reference voltage on the analog bus, said manager operating to compare the local reference voltage on the analog bus against said manager reference voltage and generating a signal on the digital bus to control the local reference voltage source in the POL until the local reference voltage is within an acceptable range of the manager reference voltage.

10. The POL of claim 9, wherein said POL has at least one analog sensing circuit for sensing an operational parameter and for supplying said parameter to said manager via the analog bus.

11. The POL of claim 10, wherein said POL has a plurality of analog sensing circuits for sensing respective operational parameters, said parameters being selectively supplied to said analog bus via a multiplexer of said POL, said multiplexer being controllable digitally by said manager via said digital bus.

12. The POL of claim 11, wherein said operational parameters are selected from the group consisting of output voltage, output current, over voltage, temperature, amplifier or comparator offset, and amplifier gain.

13. The POL of claim 10, further comprising a calibrating circuit for calibrating said at least one analog sensing circuit, said calibrating circuit being controllable digitally by said manager via said digital bus.

14. The POL of claim 9, wherein each said POL further comprises a PWM circuit which controls the duty cycle of said drivers.

15. The POL of claim 14, further comprising a pair of switching devices in a half-bridge arrangement, each of said switching devices having a control input terminal connected to a respective one of said internal drivers.

16. A power control method for a plurality of point-of-load regulators (POL) providing corresponding regulated output voltages; and a manager for communicating control signals and operational parameters with said point-of load regulators, said manager having a manager reference voltage source generating a manager reference voltage; comprising the steps of: providing a bi-directional, digital bus connected to said manager and to each of said plurality of point-of-load regulators to permit communication of control signals therebetween; and providing a bi-directional analog bus connected to said manager and to each of said plurality of point-of-load regulators to permit communication of said operational parameters therebetween;
wherein each said POL has a local reference voltage source generating a local reference voltage, further comprising operating said manager to poll each said POL via the digital bus, said POL in response to polling multiplexing the local reference voltage on the analog bus, operating said manager to compare the local reference voltage on the analog bus against said manager reference voltage and generating a signal on the digital bus to control the local reference voltage source in the POL until the local reference voltage is within an acceptable range of the manager reference voltage.

17. The method of claim 16, wherein each said POL has at least one analog sensing circuit for sensing an operational parameter and said parameter is supplied to said manager via the analog bus.

18. The method of claim 17, wherein said POL has a plurality of analog sensing circuits for sensing respective operational parameters, said parameters being selectively supplied to said analog bus via a multiplexer of said POL, said multiplexer being controlled digitally by said manager via said digital bus.

19. The method of claim 18, wherein said operational parameters are selected from the group consisting of output voltage, output current, over voltage, temperature, amplifier or comparator offset, and amplifier gain.

20. The method of claim 17, further comprising a calibrating circuit for calibrating said at least one analog sensing circuit, said calibrating circuit being controlled digitally by said manager via said digital bus.

* * * * *